United States Patent
Strohmeier et al.

(10) Patent No.: US 8,943,699 B2
(45) Date of Patent: Feb. 3, 2015

(54) CUTTING DEVICE, IN PARTICULAR RESCUE CUTTERS

(75) Inventors: Kurt Strohmeier, Aschach (AT); Peter Herwig, Schmalkalden (DE)

(73) Assignee: Weber-Hydraulik GmbH (AT)

( * ) Notice: Subject to any disclaimer, the term of this patent is extended or adjusted under 35 U.S.C. 154(b) by 869 days.

(21) Appl. No.: 13/124,515

(22) PCT Filed: Oct. 15, 2009

(86) PCT No.: PCT/AT2009/000402
§ 371 (c)(1),
(2), (4) Date: Sep. 2, 2011

(87) PCT Pub. No.: WO2010/042966
PCT Pub. Date: Apr. 22, 2010

(65) Prior Publication Data
US 2012/0017446 A1    Jan. 26, 2012

(30) Foreign Application Priority Data
Oct. 16, 2008  (AT) ..................................... 589/2008

(51) Int. Cl.
*B26B 15/00* (2006.01)
*B26B 13/00* (2006.01)
*A62B 3/00* (2006.01)
*B23D 27/02* (2006.01)

(52) U.S. Cl.
CPC ................ *B23D 27/02* (2013.01); *A62B 3/005* (2013.01)
USPC ............................................ 30/228; 30/241

(58) Field of Classification Search
USPC ........... 30/180, 182, 228, 241, 92, 379, 379.5
See application file for complete search history.

(56) References Cited

U.S. PATENT DOCUMENTS

| 706,481 | A | * | 8/1902 | Wilson ............................ 30/228 |
| 1,786,625 | A | * | 12/1930 | Lindstrom et al. .............. 30/228 |
| 2,195,045 | A | * | 3/1940 | Bernay ........................... 30/228 |
| 2,203,455 | A | | 6/1940 | Cross |
| 2,257,245 | A | * | 9/1941 | Rudolph ......................... 30/228 |
| 2,329,387 | A | | 9/1943 | Grenning |
| 2,543,109 | A | * | 2/1951 | Holowka ........................ 30/228 |

(Continued)

FOREIGN PATENT DOCUMENTS

| CH | 260368 A | 3/1949 |
| DE | 19526070 A1 | 1/1997 |

(Continued)

OTHER PUBLICATIONS

International Search Report, PCT/AT2009/000402, dated Feb. 18, 2010.

*Primary Examiner* — Jason Daniel Prone
(74) *Attorney, Agent, or Firm* — Lerner, David, Littenberg, Krumholz & Mentlik, LLP (57) ABSTRACT

The invention relates to a cutting device providing a main frame body, at least one stationary cutting element disposed on the main frame body, a drive system disposed on the main frame body, in particular in the form of a fluid cylinder, and a cutting blade drivingly connected to the drive system and guided in its movement on the main frame body, which co-operates with the stationary cutting element. The main frame body and/or the drive system is made from an essentially light metal or a light metal alloy with a density of less than 5000 kg/m³, in particular less than 3000 kg/m³.

17 Claims, 3 Drawing Sheets

(56) References Cited

U.S. PATENT DOCUMENTS

| | | | |
|---|---|---|---|
| 2,644,194 A * | 7/1953 | Fill | 30/92 |
| 2,711,583 A * | 6/1955 | Raby | 30/228 |
| 2,714,250 A * | 8/1955 | Twedt | 30/180 |
| 2,716,813 A * | 9/1955 | Smyres | 30/228 |
| 2,751,943 A * | 6/1956 | Ford | 30/228 |
| 2,764,813 A * | 10/1956 | Hoffman | 30/228 |
| 2,766,525 A * | 10/1956 | Hoffman | 30/228 |
| 2,863,214 A * | 12/1958 | Szappanyos | 30/180 |
| 3,003,235 A * | 10/1961 | Temple et al. | 30/180 |
| 3,008,234 A * | 11/1961 | Mattera | 30/228 |
| 3,041,725 A * | 7/1962 | Harries | 30/180 |
| 3,175,289 A * | 3/1965 | Wilterdink et al. | 30/180 |
| 3,199,193 A * | 8/1965 | Norty | 30/228 |
| 3,509,706 A * | 5/1970 | McCutcheon et al. | 30/180 |
| 3,922,780 A * | 12/1975 | Green | 30/92 |
| 4,026,028 A * | 5/1977 | Green | 30/241 |
| 4,106,194 A * | 8/1978 | Steed | 30/228 |
| 4,198,748 A * | 4/1980 | Lewis | 30/180 |
| 4,249,308 A | 2/1981 | Boyajian | |
| 4,463,496 A * | 8/1984 | Reich et al. | 30/180 |
| 4,627,167 A * | 12/1986 | Karubian et al. | 30/228 |
| 4,779,502 A * | 10/1988 | Hebert | 30/228 |
| 5,046,250 A * | 9/1991 | Huang | 30/92 |
| 5,070,616 A * | 12/1991 | Chen | 30/92 |
| 5,205,041 A * | 4/1993 | Brosadola | 30/180 |
| 5,216,813 A | 6/1993 | Kodachi et al. | |
| 5,218,765 A * | 6/1993 | Huang | 30/92 |
| 5,465,490 A * | 11/1995 | Smith et al. | 30/180 |
| 5,711,078 A * | 1/1998 | Patton et al. | 30/228 |
| 5,722,170 A * | 3/1998 | Smith | 30/228 |
| 6,311,537 B1 | 11/2001 | Vigil | |
| 6,349,474 B1 * | 2/2002 | Jordan | 30/228 |
| 6,671,966 B2 * | 1/2004 | Lewis | 30/228 |
| 6,745,611 B2 * | 6/2004 | Lefavour et al. | 30/180 |
| 6,754,959 B1 * | 6/2004 | Guiette et al. | 30/92 |
| 6,938,531 B2 * | 9/2005 | Yoshimizu et al. | 30/228 |
| 7,111,541 B2 | 9/2006 | Kimura | |
| 7,673,392 B1 * | 3/2010 | Bzorgi | 30/180 |
| 8,505,877 B2 * | 8/2013 | Strohmeier | 254/93 R |
| 2013/0283985 A1 * | 10/2013 | Vangura | 30/228 |
| 2014/0123824 A1 * | 5/2014 | Strohmeier et al. | 83/694 |
| 2014/0165410 A1 * | 6/2014 | Johnson et al. | 30/228 |

FOREIGN PATENT DOCUMENTS

| | | |
|---|---|---|
| EP | 0501408 A2 | 9/1992 |
| EP | 1533063 A1 | 5/2005 |
| FR | 2715095 A1 | 7/1995 |
| JP | 03-131480 A | 6/1991 |
| WO | WO 2008055280 A1 * | 5/2008 |
| WO | WO 2010042966 A1 * | 4/2010 |
| WO | WO 2012162714 A1 * | 12/2012 |

* cited by examiner

CUTTING DEVICE, IN PARTICULAR RESCUE CUTTERS

CROSS REFERENCE TO RELATED APPLICATIONS

The present application is a national phase entry under 35 U.S.C. §371 of International Application No. PCT/AT2009/000402, filed Oct. 15, 2009, published in German, which claims the benefit of Austrian Patent Application No. GM 589/2008, filed Oct. 16, 2008. The disclosures of said applications are incorporated by reference herein.

BACKGROUND OF THE INVENTION

The invention relates to a cutting device of the type outlined in the introductory part of claim 1.

A cutting device of this type is known from patent specification FR 2 715 095 A1 for example, and cutting devices of this type are advantageously used for rescuing passengers from vehicles which have been involved in an accident if the doors of a vehicle are no longer operational after an accident and it is necessary to cut open a vehicle in order to rescue passengers after an accident. A cutting device of this type comprises a main frame body on which a stationary cutting element is disposed, as well as a hook-shaped cutting blade which can be moved towards the stationary cutting element by means of a drive system, thereby enabling an object disposed between the displaceable cutting blade and the stationary cutting element to be cut open by cutting or tearing a strip-shaped portion out of the object so as to split the object open. By tearing out adjacent strips, it is also possible to break open a flat object, thereby enabling a vehicle to be opened in order to rescue a passenger. To ensure that it is also possible to cut open robust and stable materials such as steel panels with a thickness in excess of 1 cm in this manner, the cutting device must be capable of transmitting very strong cutting forces or shearing forces to an object and such cutting devices must be very strong in terms of their design. The disadvantage of this is that the weight of such a cutting device is very high, usually in the range of approximately 30 kg, which usually makes it very difficult or even impossible for a single person to operate it. U.S. Pat. No. 2,329,387 A discloses another hand-operated tool for cutting sheet metal, whereby a pivoting movement of two handles mounted on a cylindrical hollow body pull a blade which is axially displaceable in the hollow body and has a cutting head at its free end which is retracted into the hollow body during a cutting operation. The blade has a rod-shaped extension on which the handles act via a connecting rod and move the blade backwards and forwards. Because these metal cutters are operated by hand, the range of applications for which they can be used is limited and they are not really suitable for rescuing passengers from vehicles that have been involved in an accident, for example. Since these metal cutters are of relatively small dimensions, this document provides no information as to how operation of a cutting device can be made easier.

BRIEF SUMMARY OF THE INVENTION

The objective of the invention is to propose a cutting device of this type which can be more easily operated whilst maintaining the same high cutting efficiency.

This objective is achieved by the invention on the basis of a cutting device incorporating the features defined in the characterizing part of claim 1.

The surprising advantage gained due to the design of the main frame body proposed by the invention and/or the drive system essentially based on a light metal or a light metal alloy is the fact that the weight of a cutting device of this type can be reduced considerably without impairing the requisite strength of the main frame body. The density of the material used for the main frame body and/or drive system is less than 5,000 kg/m$^3$, in particular less than 3,000 kg/m$^3$. Compared with a conventional main frame body made from steel, it is necessary to opt for bigger cross-sectional dimensions of the main frame body in order to achieve the same strength but in spite of bigger cross-sections and a corresponding increase in the volume of the main frame body overall, a considerable saving in weight can be achieved. Whereas a conventional cutting device with a main frame body made from steel has an operating weight of approximately 30 kg, the operating weight of a cutting device based on the invention can be reduced to approximately 20 kg, in other words a weight saving of one third can be achieved by the design of the main frame body and drive system proposed by the invention.

The drive system is provided in the form of a linear drive in particular, which comprises a displacing element connected to the displaceable cutting blade. In this respect, the linear drive may be a threaded spindle drive, for example, but the linear drive is preferably provided in the form of a fluid cylinder or hydraulic cylinder, by means of which the strong displacement forces which have to be applied to the cutting blade can be achieved. Parts of the drive system which may be made from light metal or a light metal alloy in the case of a threaded spindle drive are both the threaded nut and the threaded spindle, and the co-operating threaded elements subjected to high stress may be made from a wear-resistant material, for example in the form of sleeve-type elements which support the displacement thread. In the case of a drive system based on a fluid cylinder or hydraulic cylinder, one of the elements, for example the cylinder, piston or piston rod, may be made from the essentially light metal or light metal alloy in particular.

The main frame body is preferably produced integrally from a solid material, which obviates the need for connecting elements to assemble a multi-part main frame body. Functional features which are absent on the main frame body originally, such as bores, flattened regions, recesses, are preferably produced by machining to remove material, in particular milling, and result in a further reduction in the operating weight of the cutting device. Other changes can be made to the design of the initial main body by means of bores, recesses, flattened regions, milled regions, etc., the sole purpose of which is to reduce weight. A forging process may also be used when producing the main frame body in order to reduce the amount of machining needed.

If the linear drive is provided in the form of a fluid cylinder or hydraulic cylinder, the cylinder jacket in particular may be made from light metal or a light metal alloy, which also enables the weight of the cutting device to be reduced considerably. In addition or alternatively, however, the piston displaceable in the fluid cylinder or hydraulic cylinder and the piston rod connecting the piston to the cutting blade may also be made from a light metal or light metal alloy. The displacing element acting on the cutting blade in the case of a fluid cylinder is provided in particular directly by the piston rod displaceable in the fluid cylinder and, this being the case, gear elements to convert the piston movement into the cutting blade movement can be dispensed with.

The light metal or an element of the light metal alloy used to make the main frame body and/or drive system is preferably selected from a group comprising at least aluminum, magnesium and titanium. These materials have a very low specific weight whilst possessing a high strength, thereby permitting a reduction in the weight of the cutting device proposed by the invention accordingly.

The main frame body may also have a recess at least partially accommodating the cutting blade, which forms a displacement chamber for the cutting blade in the interior of the main frame body, the latter being guided in the main frame body to a certain extent so that any inadvertent flexing of the cutting blade relative to the main frame body is prevented during the cutting movement. In the case of a main frame body based on an integral design, the recess may be produced by milling.

The main frame body may have a circular cylindrical main shape in at least certain regions, which makes the cutting device ergonomic and easy to handle and also guarantees the high stability needed under rugged deployment conditions whilst providing an efficient guide for the cutting blade. Due to the bigger extension of the main frame body transversely to the cutting plane or transversely to the cutting blade mid-plane, the cutting device has a high resistance to bending transversely to the shearing plane and the main frame body is subjected to only the slightest of deformations if exposed to laterally acting, non-symmetrical shearing forces. The circular cylindrical main frame body may have flattened regions on the external circumference extending parallel with the shearing mid-plane, on which other elements of the cutting device may be disposed, in particular a U-shaped handle or grip to facilitate manipulation of the cutting device, and the free ends of the U are attached to the flattened regions of the main frame body and the base of the U extends at a distance from the main frame body and approximately at a right angle to the shearing mid-plane. The means used to attach the handle or grip may be designed so that its orientation or position relative to the main frame body can be adjusted rather than being restricted to just one orientation or position.

In order to prevent the occurrence of wear on the main frame body as far as possible, it is of advantage if the stationary cutting element on the main frame body co-operating with the displaceable cutting blade is of a higher hardness than the rest of the actual main frame body. The material of the cutting element or cutting elements will be more readily able to withstand the high stresses which occur during the shearing process or cutting process, thereby significantly reducing the occurrence of wear such as blunting of the cutting edges or shearing edges. A locally increased hardness of the cutting element surface can be achieved by applying a hard surface coating, for example, in particular based on a material join.

If the cutting element is connected to the main frame body so that it can be detached, it can easily be replaced in the event of wear or damage so that the functionality and efficiency of the cutting device can be restored to what it was in the initial state. The cutting element may advantageously be made from a hard, resistant material such as cold-worked steel or tempered steel.

In order to obtain a reliable connection between the cutting element and main frame body, the cutting element may be connected to the frame body by means of at least one fixing element, and in this respect, fixing elements in the form of screw elements have proved to be of practical advantage. As an alternative to separate fixing elements, the cutting element may also have fixing projections, which are positively fitted in fixing recesses of the main frame body, in which the cutting element is inserted from the side, in other words transversely to the main direction of the load through the main frame body.

To enable a strip-shaped element to be cut out from the object being cut open, it is of advantage if the cutting element has a cutting recess through which the cutting blade extends with only a slight functional clearance and which forms two shearing edges disposed symmetrically with respect to the mid-plane of the cutting blade co-operating with the cutting blade. Based on a flat design, the cutting blade has a thickness which at least approximately corresponds to the clearance width of the cutting recess and advantageously also has two shearing edges. When the resultant operating forces needed to move the cutting blade are transmitted through its mid-plane and thus act in the plane of symmetry between the co-operating shearing edges, the shearing forces will also be more or less symmetrical with respect to the mid-plane and there will be no torques acting laterally on the cutting device and/or the object being cut during the cutting operation.

The cutting blade may be specifically displaced in a direction approximately at a right angle to the active surface of the cutting element, and if using an approximately hook-shaped cutting blade with the cutting edge at an oblique angle, the object being cut will be pulled towards the surface of the cutting element. An opening angle between the end surface of the cutting element and the shearing edges on the cutting blade may be such in particular that the point of attack of the shearing action on the object being cut as the cutting blade gradually penetrates shifts continuously and the shearing edges on the cutting blade will not be active across their full length at a certain point in time, which would then require significantly stronger cutting forces or pulling forces on the cutting blade. Due to this oblique design of the active shearing edges on the cutting blade, a cut with more pull is obtained, which requires the application of less force and results in clean cut edges on the object being cut open.

It may be preferable for the cutting blade to have a cutting blade main body of an essentially constant thickness, thereby offering simple options for the manufacture of the cutting blade. For example, the cutting blade may be cut from a sheet of initial material by a process of wire erosion, in which case virtually any contour may be selected for the cutting blade. Since the cutting blade and/or also the cutting element is also made from a hard, resistant material such as cold-worked steel or tempered steel, this option of manufacturing from a sheet-shaped base material obviating the need for machining to remove material will be much simpler to perform.

The connection of the cutting blade to the displacing element of the drive system, in particular a piston rod of the fluid cylinder or some other connecting element to the drive system, may preferably be made with at least one fixing element which is fitted positively in a connecting recess in the cutting blade. For example, the fixing element may extend through the cutting blade and displacing element or piston rod, in which case it is necessary to provide nothing more than a simple recess in the form of a bore in the two parts to be connected. The fixing element will be exposed to shearing stress and is dimensioned accordingly. For example, the fixing element may be provided in the form of a bolt extending through the displacing element of the drive system for the cutting blade and its position in the fitted state is fixed by means of locking rings.

In order to detach and fit the at least one fixing element, at least one access orifice is provided in the main frame body, thereby enabling the cutting blade to be replaced if the main frame body is made in a single piece. The longitudinal axis of the fixing element in the form of a bolt is preferably oriented at a right angle with respect to the cutting blade mid-plane.

In order to guide the cutting blade in the main frame body, it is of advantage if a guide element extending in the displacement direction of the cutting blade is releasably attached to the main frame body in order to absorb a reaction force occurring in the shearing plane of the cutting blade transversely to the displacement direction of the cutting blade, which guides the cutting blade in at least one direction. The cutting blade is then guided by the guide element in the displacement direction of the drive system and the latter may be made from a different and in particular harder material than that of the main frame body. By opting for a detachable connection to the main frame body, the guide element can also be replaced and adapted to a different geometry of the cutting blade, e.g. to a different thickness.

The guide element may be detachably connected to the main frame body by means of screw elements in particular.

The guide element may also be made from a material selected from a group comprising at least steel, tool steel, cold-worked steel, thereby imparting greater strength to the guide element compared with the material used for the main frame body so that it can not be damaged by the forces caused by the cutting blade during a cutting operation.

The guide element may comprise at least one guide bar extending into guide recesses on the cutting blade in the direction of displacement, thereby ensuring that the cutting blade can be guided in two directions. The guide bar of the guide element specifically extends more or less at a right angle towards the cutting blade mid-plane into a co-operating guide groove of the cutting blade. A guide groove of this type can easily be produced by milling, thereby improving the guiding action of the cutting blade in the guide element and hence also in the main frame body. The cutting element may also have a guiding effect on the cutting blade and can be regarded as another embodiment of a guide element.

The cutting element, in particular its end surface which is placed on the object being cut open, may have a width extending transversely to the shearing plane or cutting blade mid-plane which corresponds to at least 1.5 times the thickness, in particular at least twice the thickness of the cutting blade or cutting blade main body. This affords a support for the cutting element on a large surface area on the object being cut open, imparting a stable support during the cutting operation and enabling a defined strip to be cut from the object by the cutting blade in a clean cut through the thickness of the cutting blade.

To enable a strip cut out from the object being cut open to be removed from the immediate cutting area more easily, it is of advantage if the main frame body has an extraction orifice disposed in the shearing plane through which the strips cut from a material being cut by the cutting blade can be removed from the cutting area in the radial direction. By reference to the longitudinal mid-axis, such an extraction orifice in the main frame body is preferably disposed lying more or less opposite the middle of a handle or grip provided on the cutting device, which will mean that a severed piece will not be removed in the direction towards the user but is removed by the user in the direction facing away from the cutting device. The extraction orifice advantageously has an internal width and internal length corresponding to at least the dimensions of the largest possible piece of material which can be cut out.

As mentioned above, the cutting device proposed by the invention can be used to particular advantage in applications involving the rescue of passengers from vehicles which have been involved in an accident because it is particularly well suited to cutting open vehicle structures, but the cutting device proposed by the invention may also be used in other applications, for example in the building industry for breaking up building materials, in particular for taking buildings apart or for other demolition work. For specific applications, it would also be possible to use it in the production of workpieces, for example for work involving the cutting of materials which are difficult to process with other methods such as welding.

The invention will be explained in more detail below with reference to examples of embodiments illustrated in the appended drawings.

BRIEF DESCRIPTION OF THE DRAWINGS

The drawings show schematically simplified diagrams of the following:

FIG. 3 shows a view of a cutting device proposed by the invention end-on.

DETAILED DESCRIPTION OF THE INVENTION

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

FIGS. 1 to 4 illustrate an example of an embodiment of a cutting device 1 proposed by the invention, which is used in particular to rescue passengers from vehicles which have been involved in an accident.

Figure 1:
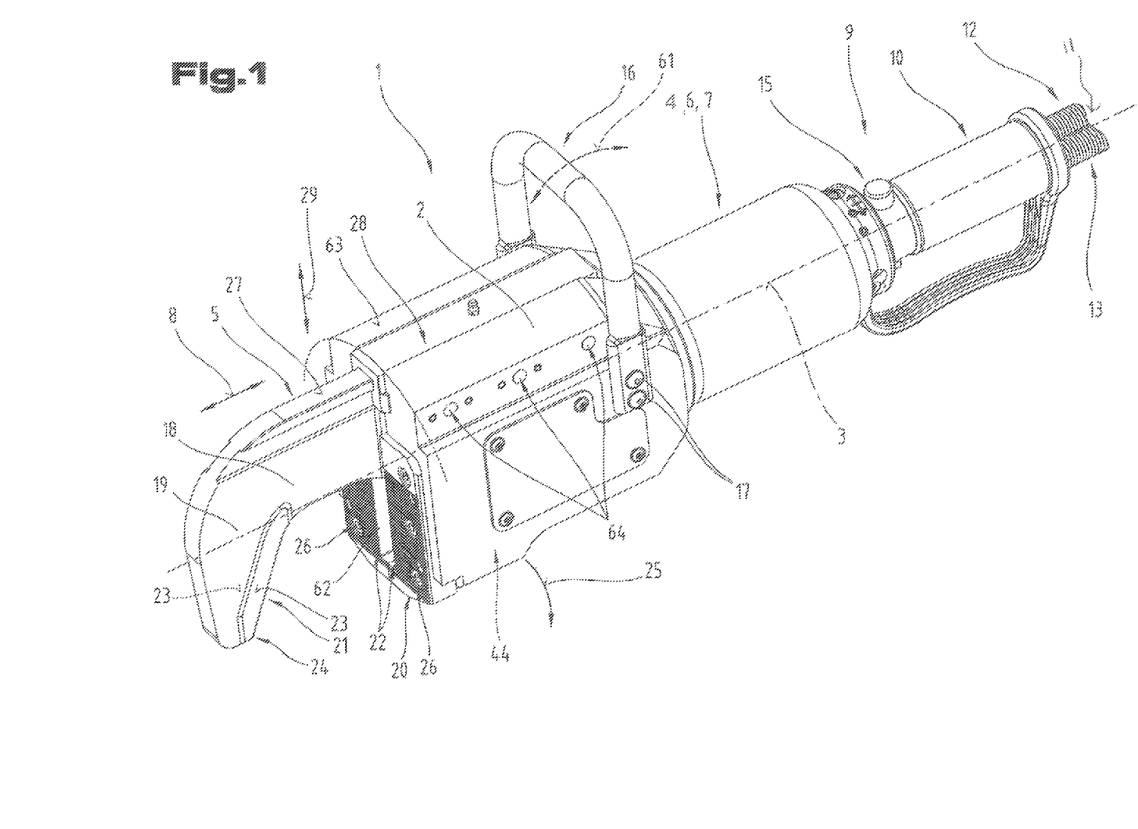
FIG. 1 is a view from an angle illustrating a cutting device with the cutting blade extracted.

FIG. 1 shows a view of the cutting device 1 from an angle and will be used to describe some of the essential components. The cutting device 1 comprises a main frame body 2 which constitutes the main component of the cutting device 1 in the embodiment illustrated as an example. The expression main frame body 2 does not necessarily refer to a frame-type shape but relates its function as a structure supporting the components in the kinematic sense, and the terms "housing" "structure" or simply "main body" could be used to describe it instead of main frame body.

The light metal or an element of the light metal alloy used to make the main frame body and/or drive system 1 is preferably selected from a group comprising at least aluminum, magnesium and titanium. The material of the main frame body may be an aluminum alloy AlZnMgCu 7075, which possesses a high strength and high stiffness.

Adjoining the main frame body 2 in the direction of a longitudinal axis 3 is a drive system 4, which is used to drive and move a hook-shaped cutting blade 5. The drive system 4 may be a linear drive 6, by means of which the cutting blade 5 is moved in a straight line, in this instance parallel with the longitudinal axis 3. The linear drive 6 in this instance comprises a fluid cylinder or hydraulic cylinder 7 by means of which the strong forces needed for a cutting operation can be generated. A double arrow in FIG. 1 indicates the displacement direction 8 of the cutting blade 5.

The hydraulic cylinder 7 is oriented approximately concentrically with the longitudinal mid-axis of the main frame body 2 and in its connecting portion 9 disposed at a distance apart from the main frame body 2 is provided with a handle 10 through which supply lines 11 for the hydraulic cylinder 7 are run in the embodiment illustrated as an example, one supply line 11 being provided in the form of a pressure line 12 and another supply line 11 being provided in the form of a return line 13, and the supply lines 11 are connected to hydraulic unit, although this is not illustrated. Disposed in the connecting portion 9 of the hydraulic cylinder 7 is a switch element 14 in the form of a push button 15, by means of which a valve controller, not illustrated in FIG. 1, in the connecting portion 9 of the hydraulic cylinder 7 can be influenced and by means of which the delivery and discharge of pressurized fluid can be controlled in order to retract and extract the cutting blade 5 in and out of the main frame body 2. In one example, provided next to the handle 10 on the connecting portion 9 of the hydraulic cylinder 7 is another handle 16, which is secured to the main frame body 2 by means of fixing screws 17, in particular at its end adjacent to the drive system 4. In another example, the fixing means may also enable the handle 16 to assume different orientations or positions if several different fixing points are provided on the main frame body 2 or on the arms of the handle 16.

The main frame body 2 is of a prismatic or cylindrical basic shape and the cross-section may be square, rectangular, circular or circular with flattened regions, for example. The cutting blade 5 for effecting the requisite inward and outward movement is mounted in a displaceable arrangement in a recess in the main frame body 2.

The cutting blade 5 is provided in the form of a plate-shaped cutting blade main body 18 and has a hook-shaped contour suitable for clamping an object, not illustrated in FIG. 1, between a hook cutter 19 pointing towards the main frame body 2 and a cutting element 20 disposed on the end face of the main frame body 2 and ultimately severing it by further increasing the tensioning force of the drive system 4—in this instance the hydraulic cylinder 7. As a result of the thickness of the cutting blade 5, there are two approximately parallel shearing edges 21 on it, which co-operate with two shearing edges 22 on a recess of the cutting element 20 through which the cutting blade 5 is extracted, forming two parallel shearing planes 23 which coincide with the flat side faces of the cutting blade 5. Due to the presence of an object along these two shearing planes 23, a strip-shaped section is cut out from the object, which is bent by the cutting element 20 into the interior of the main frame body 2 and can finally be removed from the main frame body 2 in the direction indicated by arrow 25, having been completely severed by the hook blade tip 24.

The main frame body 2 is essentially made from a light metal or a light metal alloy which has a density of less than 5,000 kg/m$^3$ but preferably less than 3,000 kg/m$^3$. At least part of the drive system 4 may also be made from light metal or a light metal alloy, thereby significantly reducing the weight of such a cutting device 1 compared with conventional rescue equipment of the type where the main components and in particular the main frame body 2 are made from steel. The cylindrical tube of the hydraulic cylinder 7 may also be made from a light metal, in which case the wall thickness of the cylindrical tube may be selected so that it is of a greater thickness than that of a conventional cylinder tube made from steel, depending on the effective strength of the light metal material. Due to the block-shaped design of the main frame body 2 with large load-bearing cross-sections, it has a very high stiffness and undergoes no deformation to speak of during a cutting operation. Since high compression forces have to be transmitted through the main frame body 2 in the direction of the longitudinal axis 3 during a cutting operation, this large load-bearing cross-section offers a high degree of reliability in terms of preventing any bending of parts of the main frame body 2, whereas there is a danger of bending in the case of a main frame body 2 with rod-type or leg-type frame parts.

The cutting element 20 disposed on the end face, in other words the end of the main frame body 2 lying opposite the drive system 4, is not made from the same light metal material as the main frame body 2 but, in order to increase cutting performance and to avoid any occurrence of wear, is made from a hard, wear-resistant material and in particular is designed as a replaceable cutting element 20 which can be connected to the main frame body 2 by means of fixing screws 26. In the embodiment illustrated as an example, the cutting element 20 is based on a one-piece design and has a cut-out through which the cutting blade 5 extends, but a multi-part design of the cutting element 20 would also be possible. The cutting blade 5 is guided in the main frame body 2 on the one hand in the sideways direction by the side faces or shearing planes 23 of the cutting blade 5, which are guided between the shearing edges 22 of the cutting element 20 with a slight functional clearance, and secondly at the rear end face 27 of the cutting blade 5 by a guide element 28 which is detachably secured in the main frame body 2, resulting in a guiding action of the cutting blade 5 extending transversely to the longitudinal axis 3, i.e. in the direction of double arrow 29. Since the cutting blade 5 is guided at its rear end face 27 by a guide arrangement secured to prevent it from coming loose, it is able to absorb tilting moments which occur during use and would otherwise cause the cutting blade 5 to twist in the shearing plane 23, and the cutting blade 5 is effectively prevented from moving out of line in its longitudinal guide.

The end surface of the cutting element 20 extends approximately at a right angle with respect to the longitudinal axis 3 of the cutting device 1, whereas the hook cutter 19 does not extend at a right angle with respect to the longitudinal axis but at an angle to it, which means that the length of the shearing edge 21 as a whole does not make contact with a flat workpiece at the same time but causes a pulling cut in the direction extending towards the hook blade tip 24. As a result of this opening angle between the cutting element 20 and hook cutter 19, it does not slide on an object as it is being cut and the surfaces of the cutting element 20 and the hook cutter 19 of the cutting blade 5 are provided with toothing, which prevents the object being cut from sliding out.

Figure 2:
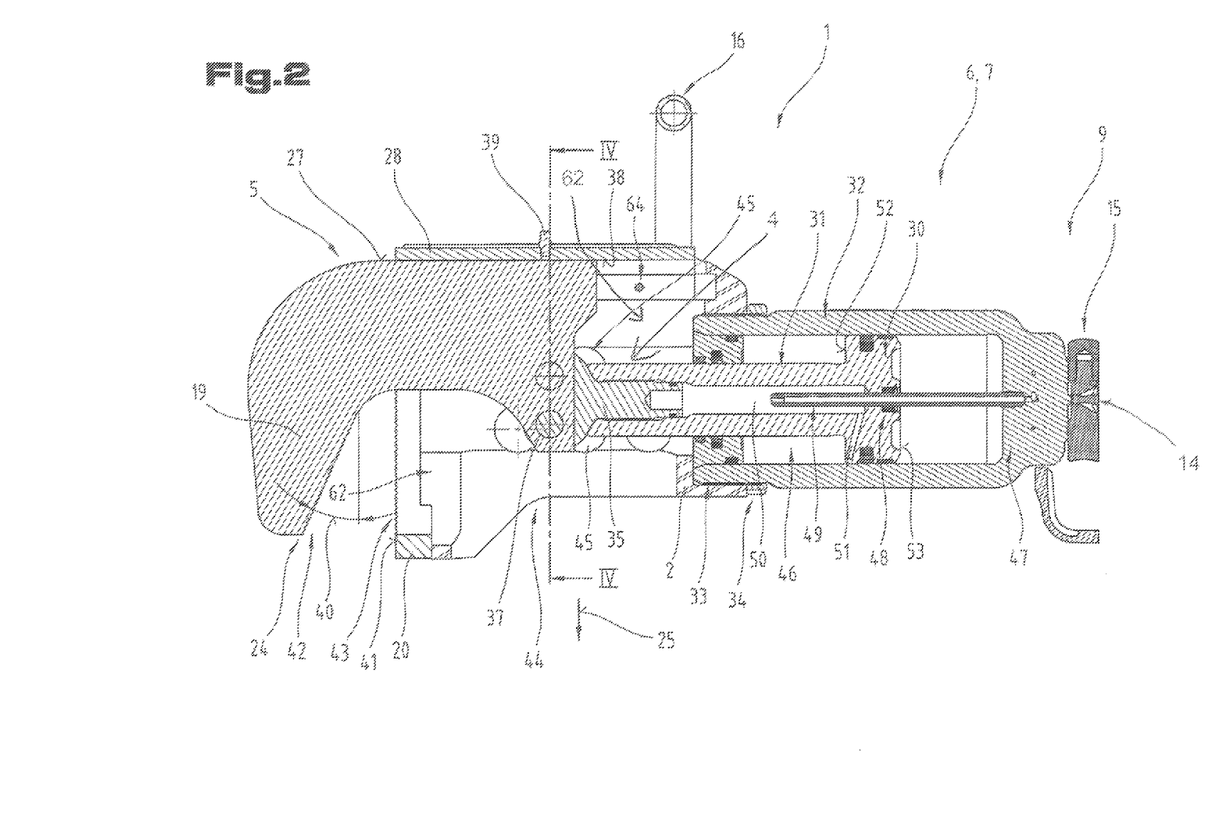
FIG. 2 shows a longitudinal section through a cutting device proposed by the invention.

FIG. 2 illustrates a longitudinal section through the cutting device 1 with the cutting blade 5 in an extended position. The tensile force on the hook-shaped cutting blade 5 is induced by a piston 30 in the hydraulic cylinder 7 operated by pressurizing medium, which is connected to a piston rod 31 which is able to move in and out of the hydraulic cylinder 7 in a reciprocating movement in the direction of the longitudinal axis. The piston 30 is guided in a cylindrical tube 32 of the hydraulic cylinder and is screwed by means of a thread 33 at its piston rod end into an internal thread of the main frame body 2. In order to prevent the cylindrical tube 32 from inadvertently working loose from the main frame body 2 during rough deployment conditions, the cylindrical tube 32 is also axially clamped to the main frame body 2 by means of a clamping nut 34.

The connection between the piston rod 31 and cutting blade 5 is established by means of a connecting element 35, one end of which is screwed to an internal thread of the piston rod 31, whilst a second end has a slot-type cut-out so that the connecting element 35 is able to grip the flat cutting blade 5 from the side and a positive shearing-resistant and tension-resistant connection is established between the connecting element 35 and cutting blade 5 by means of a fixing element 36 in the form of a bolt 37. Appropriate transverse bores extending at a right angle with respect to the shearing planes 23 are provided in the cutting blade 5 and in the connecting element 35 for this purpose, in which the fixing elements 36 can be inserted, in this case in the form of bolts 37. The movement of the piston 30 in a straight line is therefore also transmitted to a movement of the cutting blade 5 in a straight line in the direction of the longitudinal axis 3 and, as described above in connection with FIG. 1, the cutting blade 5 is also guided at a rear end face 27 in a guide element 28. A guide surface 38 of the guide element 28 co-operating with the rear end face 27 and the rear end face 27 may be supplied with lubricant via a lubricating nipple 39, thereby reducing frictional resistance between the rear end face 27 and the guide surface 38. As may also be seen from FIG. 2, the guide element 28 may also be releasably secured in the main frame body 2 by means of screws 40.

FIG. 2 also illustrates the oblique angle 40 between the hook cutter 19 and the end face 41 of the cutting element 20.

This oblique angle 40 between the hook cutter 19 and the end face 41 causes a reaction force acting on the cutting blade 5 transversely to the longitudinal axis 3, which is absorbed by the guide element 28 and transmitted to the main frame body 2 in the embodiment illustrated as an example. In order to prevent the cutting device from sliding off the object being cut, the hook cutter 19 is provided with toothing 42 and the cutting element 20 is provided with toothing 43, which push into the surface of the object being cut during a cutting operation and thus reduce the risk of sliding.

FIG. 2 also illustrates a discharge orifice 44 in the main frame body 2 through which a strip cut out from the object can be discharged from the cutting device 1 in the direction of arrow 25. Also provided in the main frame body 2 are access orifices through which the fixing elements 36 in the form of bolts 37 can be fitted and removed. To this end, the hydraulic cylinder 7 is operated so that the piston 30 with the piston rod 31 is extracted until the fixing elements 36 sit flush with the access orifices 45, thereby enabling the bolts 37 to be axially inserted and removed.

In a manner known from the prior art, seals may be provided, for example as a means of sealing the piston 30, sealing the piston rod passage and cylinder base in the position inserted from the piston rod end. To avoid running pressurizing medium lines outside or pressurizing medium passages in the cylindrical tube 32, the pressurizing fluid is fed into the working chamber 46 at the piston rod end sealed by the piston—piston rod arrangement. To this end, the piston rod 31 is of a hollow design and a pressure pipe 49 extends coaxially from the cylinder head 47 through a sealed passage 48 into the hollow interior of the piston rod 31, which in this instance may be described as a piston rod cavity 50. The pressurizing medium, which in this instance is a hydraulic fluid, is fed from this piston rod cavity 50 through a transverse bore 51 to the annular face 52 of the piston 30 at the rear end of the working chamber 46.

During a cutting operation when the cutting blade 5 is retracted into the main frame body 2, pressurized fluid is fed through the pressure pipe 49, piston rod cavity 50 and transverse bore 51 to the working chamber 46 and the piston 30 with the piston rod 31 and cutting blade 5 is retracted as a result. In order to extract the cutting blade 5, pressurized fluid is fed to the piston surface 53 at the cylinder head end. The switch between feeding pressurizing medium to the working chamber 46 and feeding it to the working chamber at the cylinder head end is controlled by means of the switch element 14 in the form of a push button 15 described above in connection with FIG. 1.

Figure 3:
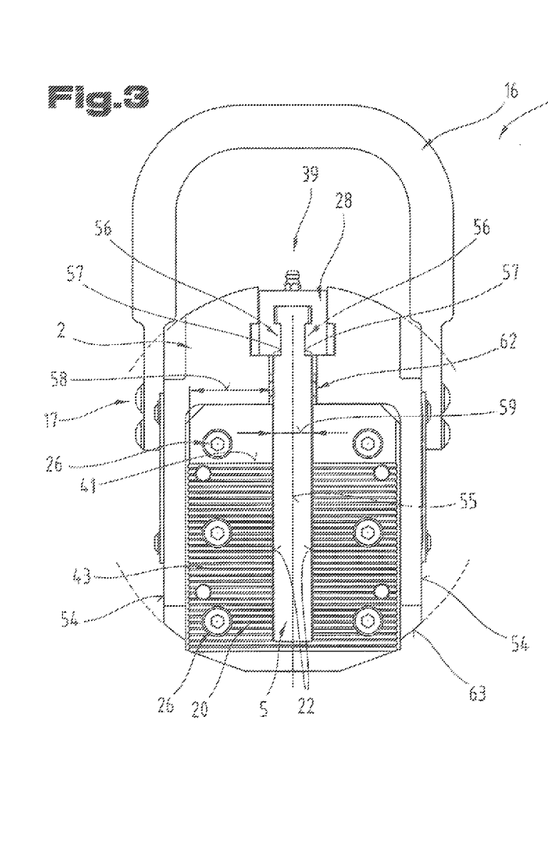

FIG. 3 is an end-on view of the cutting device 1 illustrating the fact that the main frame body 2 has a circular cylindrical basic shape and is of a slimmer design at the side faces 54 due to flattened regions in order to save weight. As described above in connection with FIG. 1 and FIG. 2, the cutting blade 5 is guided in the shearing plane by a linear drive 6 and the guide element 28, as well as transversely to the mid-plane 55 by the cutting element 20 and its shearing edges 22, which serve as cutting edges between the end face 41 and the cut-out in the cutting element 20. As may be seen from this end-on view, the guide element 28 has guide bars 56 which locate in lateral guide recesses 57 of the cutting blade 5. This results in a T-shaped guide groove between the cutting blade 5 and the guide element 28, affording a strong guiding action.

This end-on view also shows the multiple screw connections of the cutting element 20 to the main frame body 2 by means of fixing screws 26. On either side of the cutting blade 5, the cutting element 20 has a width 58 which corresponds to more than one and a half times, preferably twice, the thickness 59 of the cutting blade 5. This width 58 of the cutting element 20 therefore results in a flat support for an object as it is being cut and hence also a clean cutting quality.

Figure 4:
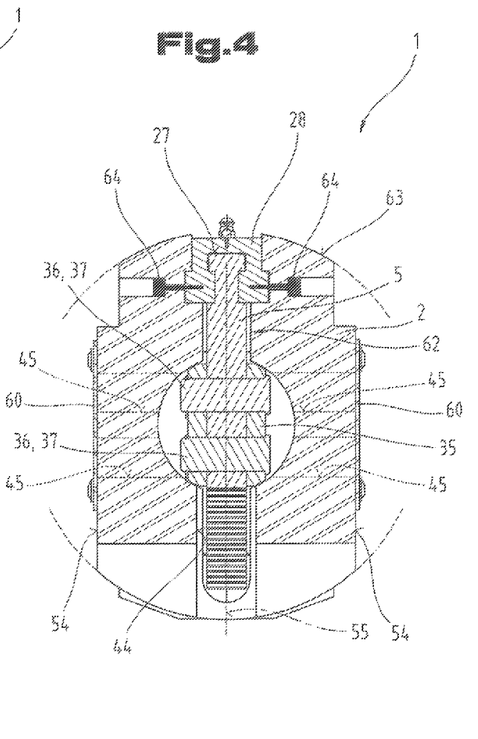
FIG. 4 shows a cross-section through a cutting device proposed by the invention in the region where the cutting blade is connected to the drive system.

FIG. 4 shows a section through the cutting device 1 along the cutting plane IV-IV indicated in FIG. 2, in which the large cross-section of the main frame body 2 made from light metal may be seen, as well as the connection of the cutting blade 5 to the connecting element 35 by means of the fixing elements 36 in the form of bolts 37. To this end, the bolts 37 have a head at one end and an annular groove at a second end for fitting locking rings. The fixing elements are fitted and removed in the axial direction, in other words transversely to the mid-plane 55, for which purpose co-operating access orifices 45 are provided in the main frame body 2, in this instance in the form of bores. These access orifices may be closed by means of a cap element 60 as illustrated in FIG. 1 and FIG. 4.

FIG. 4 also illustrates the guide element 28, the guide surfaces of which for the cutting blade 5 form the internal contour of a T-groove rail and are thus able to transmit forces to the main frame body 2 in all directions in addition to the displacement direction of the cutting blade 5 as indicated by double arrow 8 in FIG. 1. The fact that the cutting blade 5 is guided by a separate guide element 28 also relieves load on the drive system 4 due to transverse forces, in particular the hydraulic cylinder 7, which means that wear of the cutting device 1 caused during use is advantageously limited to elements which can be easily replaced, such as the cutting blade 5, cutting element 20 and guide element 28.

FIG. 1 also illustrates the pivoting movement of the handle 16 in the direction indicated by double arrow 61, as a result of which the cutting device 1 can be adapted to restricted spaces. To this end, as noted above, the fixing screws 17 may also be replaced by a fixing device which can be operated and displaced without the need for tools.

The embodiments illustrated as examples represent possible variants of the cutting device, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

For the sake of good order, finally, it should be pointed out that, in order to provide a clearer understanding of the structure of cutting device, it and its constituent parts are illustrated to a certain extent out of scale and/or on an enlarged scale and/or on a reduced scale.

The objective underlying the independent inventive solutions may be found in the description.

Above all, the individual embodiments of the subject matter illustrated in FIGS. 1, 2, 3, 4 constitute independent solutions proposed by the invention in their own right. The objectives and associated solutions proposed by the invention may be found in the detailed descriptions of these drawings.

| List of reference numbers | |
|---|---|
| 1 | Cutting device |
| 2 | Main frame body |
| 3 | Longitudinal axis |
| 4 | Drive system |
| 5 | Cutting blade |
| 6 | Linear drive |
| 7 | Hydraulic cylinder |
| 8 | Double arrow |
| 9 | Connecting portion |
| 10 | Handle |
| 11 | Supply line |
| 12 | Pressure line |
| 13 | Return line |
| 14 | Switch element |
| 15 | Push button |
| 16 | Handle |
| 17 | Fixing screw |
| 18 | Cutting blade main body |
| 19 | Hook cutter |
| 20 | Cutting element |
| 21 | Shearing edge |
| 22 | Shearing edge |
| 23 | Shearing planes |
| 24 | Hook blade tip |
| 25 | Arrow |
| 26 | Fixing screw |
| 27 | Rear end face |
| 28 | Guide element |
| 29 | Arrow |
| 30 | Piston |
| 31 | Piston rod |
| 32 | Cylindrical tube |
| 33 | Thread |
| 34 | Clamping nut |
| 35 | Connecting element |
| 36 | Fixing element |
| 37 | Bolt |
| 38 | Guide surface |
| 39 | Lubricant |
| 40 | Oblique angle |
| 41 | End face |
| 42 | Toothing |
| 43 | Toothing |
| 44 | Discharge orifice |
| 45 | Access orifice |
| 46 | Working chamber |
| 47 | Cylinder head |
| 48 | Passage |
| 49 | Pressure pipe |
| 50 | Piston rod cavity |
| 51 | Transverse bore |

-continued

| List of reference numbers | |
|---|---|
| 52 | Annular face |
| 53 | Piston surface |
| 54 | Side face |
| 55 | Mid-plane |
| 56 | Guide bar |
| 57 | Guide recesses |
| 58 | Width |
| 59 | Thickness |
| 60 | Cap element |
| 61 | Double arrow |

The invention claimed is:

1. A cutting device comprising:
a main frame body having a receiving portion and the main frame body comprises a metal with a density of less than 5000 kg/m$^3$ or a metal alloy with a density of less than 5000 kg/m$^3$;
a cutting blade having at least two guide recesses;
a guide element having at least two guide bars, the guide element is detachably secured to the main frame body and arranged in the receiving portion, and the at least two guide bars of the guide element are respectively received by the at least two guide recesses of the cutting blade wherein the guide element only comes into contact with the main frame body and the cutting blade;
a handle spaced from the guide element;
at least one stationary cutting element disposed on the main frame body; and
a drive system disposed on the main frame body, and the cutting blade connected to the drive system and arranged for guided movement within the main frame body to co-operate with the at least one stationary cutting element.

2. The cutting device according to claim 1, wherein the metal or the metal alloy is selected from the group consisting of aluminum, aluminum alloy, magnesium, and titanium.

3. The cutting device according to claim 1, wherein the main frame body has a recess at least partially accommodating the cutting blade by having a displacement chamber for the cutting blade within the main frame body.

4. The cutting device according to claim 1, wherein the main frame body has two curved out portions.

5. The cutting device according to claim 1, wherein the at least one stationary cutting element has a higher hardness than the metal or metal alloy of the main frame body.

6. The cutting device according to claim 1, wherein the at least one stationary cutting element is detachably connected to the main frame body.

7. The cutting device according to claim 6, further comprising at least one fixing element arranged to detachably connect the at least one stationary cutting element to the main frame body.

8. The cutting device according to claim 7, wherein the at least one fixing element comprises a screw.

9. The cutting device according to claim 1, wherein the at least one stationary cutting element has a cutting recess through which the cutting blade extends with a functional clearance, which forms two shearing edges co-operating with the cutting blade disposed symmetrically with respect to a mid-plane of the cutting blade.

10. The cutting device according to claim 1, wherein a displacement direction of the cutting blade extends at least approximately at a right angle with respect to an active surface of the at least one stationary cutting element.

11. The cutting device according to claim 1, wherein the cutting blade has a cutting blade main body with an essentially constant thickness.

12. The cutting device according to claim 1, wherein the cutting blade is connected to the drive system by at least one fixing element positively co-operating with a connecting recess in the cutting blade, in particular, a piston rod of a fluid cylinder based drive system.

13. The cutting device according to claim 12, wherein at least one access orifice is provided in the main frame body for removing and fitting the at least one fixing element.

14. The cutting device according to claim 1, further comprising a screw arranged to detachably secure the guide element to the main frame body.

15. The cutting device according to claim 1, wherein the guide element is made from a material selected from the group consisting of steel, tool steel, and cold-worked steel.

16. The cutting device according to claim 1, wherein the at least one stationary cutting element has a width extending transversely to a mid-plane, the cutting blade has a first thickness, and the cutting blade main body has a second thickness, the width of the at least one stationary cutting element being at least twice the thickness of the first or second thickness.

17. The cutting device according to claim 1, wherein the main frame body has an extraction orifice disposed in a mid-plane through which a piece cut by the cutting blade from an object being cut can be removed from a cutting area in the mid-plane.

* * * * *